United States Patent
Rashid (10) Patent No.: US 8,225,016 B2
(45) Date of Patent: Jul. 17, 2012

(54) EVEN AND ODD FRAME COMBINATION DATA PATH ARCHITECTURE

(75) Inventor: Mamun Ur Rashid, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 12/006,247

(22) Filed: Dec. 31, 2007

(65) Prior Publication Data

US 2009/0172215 A1    Jul. 2, 2009

(51) Int. Cl.
*G06F 13/12* (2006.01)
(52) U.S. Cl. ............... 710/71; 710/52; 710/74
(58) Field of Classification Search .......... None
See application file for complete search history.

(56) References Cited

U.S. PATENT DOCUMENTS

| | | | |
|---|---|---|---|
| 5,077,656 A * | 12/1991 | Waldron et al. | 710/305 |
| 7,590,789 B2 | 9/2009 | Rashid | |
| 2006/0195631 A1 * | 8/2006 | Rajamani | 710/51 |
| 2006/0268723 A1 * | 11/2006 | Vogel et al. | 370/241 |
| 2007/0005831 A1 * | 1/2007 | Gregorius | 710/52 |
| 2007/0220401 A1 * | 9/2007 | Bains | 714/766 |
| 2008/0115039 A1 * | 5/2008 | Bains | 714/763 |
| 2008/0222443 A1 * | 9/2008 | Wallner et al. | 713/502 |
| 2009/0013108 A1 * | 1/2009 | Rajamani | 710/71 |

* cited by examiner

*Primary Examiner* — Eron J Sorrell
(74) *Attorney, Agent, or Firm* — Caven & Aghevli LLC (57) ABSTRACT

Methods and apparatus to odd and even frame combination data path architectures are described. In one embodiment, a logic may include a buffer and a parallel input, serial output (PISO) logic that may be utilized for transferring data between a source and a destination. The logic may be utilized for transferring the data whether or not the data is transmitted in accordance with single ended or differential signals. Other embodiments are also described.

24 Claims, 6 Drawing Sheets

EVEN AND ODD FRAME COMBINATION DATA PATH ARCHITECTURE

FIELD

The present disclosure generally relates to the field of electronics. More particularly, an embodiment of the invention relates to an even and odd frame combination data path architecture.

BACKGROUND

As processors increase their processing capabilities, one concern is the speed at which a main memory may be accessed by a processor. For example, to process data, a processor may need to first fetch data from a main memory. After completion of the processing, the results may need to be stored in the main memory. To improve performance, some processors may have access to a cache that temporarily stores the data. However, cache sizes are generally much smaller than a main memory. Thus, speed of an interface between a processor and a main memory may be a critical factor in overall computing performance.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof.

Some of the embodiments discussed herein relate to even and odd frame combination data path architectures. In an embodiment, the techniques discussed here may be applied to a memory interface provided between a processor and a main memory. In some embodiments, parallel data may be received from a source, stored in a buffer (such as the FIFOs discussed with reference to FIGS. 1-11). One or more serial bit streams may be generated based on the parallel data. As discussed herein, the same architecture may be used for handling both single ended signals and differential signals. Moreover, some embodiments may be provided in various environments, such as those discussed herein with reference to FIG. 12, for example.

Figure 1A:
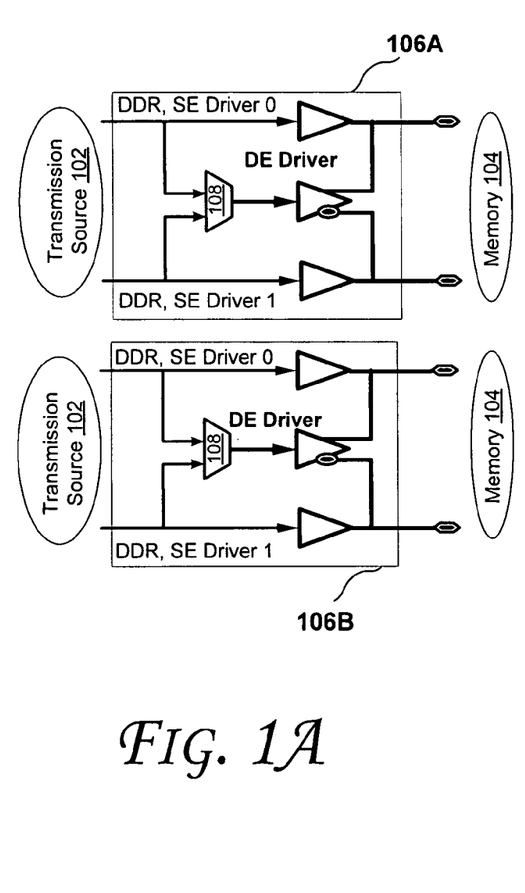
FIG. 1A illustrates odd and even frame combination data path architectures, according to some embodiments of invention.

FIG. 1A illustrates odd and even frame combination data path architectures, according to some embodiments of invention. In one embodiment, the architecture shown in FIG. 1A may be utilized for a combined differential (e.g., 9 UI (Unit Interval)) and single ended (SE) (e.g., DDR (Double Data Rate) or GDDR (Graphics DDR)) 2UI or 4UI memory) interface. The interface may be provided between a transmission source 102 (e.g., a processor) and a memory 104 (such as the main memory discussed with reference to FIG. 12, for example).

Figure 1B:
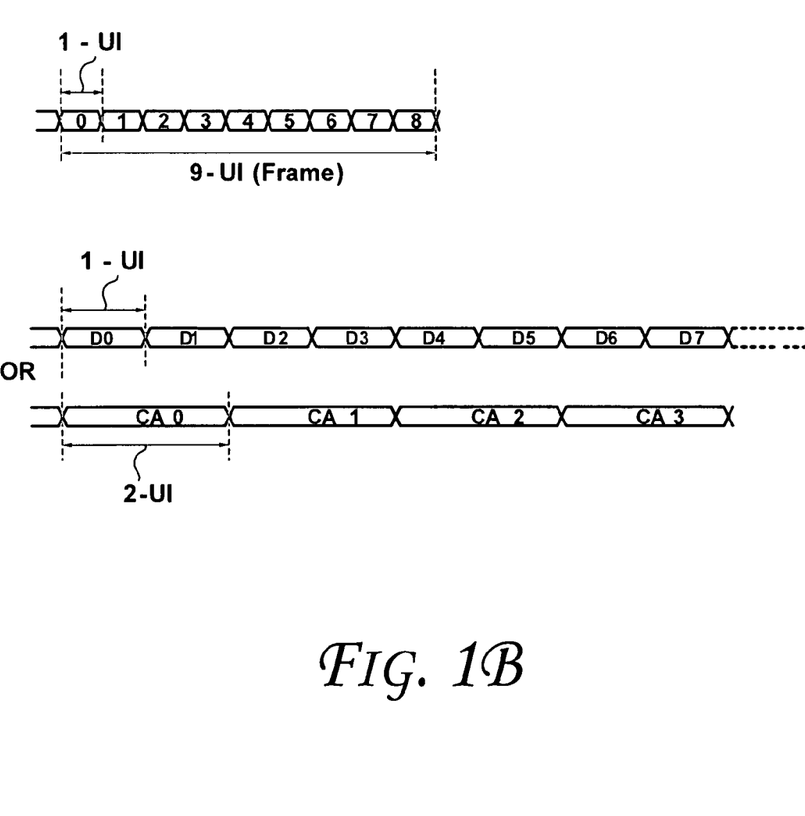
FIG. 1B illustrates format of data and/or commands that may be written by the drivers shown in FIG. 1A.

FIG. 1B illustrates format of data and/or commands that may be written by the corresponding drivers shown in FIG. 1A. For example, the top portion of FIG. 1A illustrates a differential mode eCA (embedded Command/Address data) combination driver 106A with 9-UI frame size (e.g., as shown in the top portion of FIG. 1B). Also, the bottom portion of FIG. 1A illustrates a single ended mode configuration of the driver shown in the top portion of FIG. 1A. The single ended driver 106B may provide separate data and command/address (e.g., as shown in the bottom portion of FIG. 1B with separate data (labeled with D0, D1, etc.) and command/address (labeled with CA 0, CA 1, etc. which may have double the UI of the data such as shown in FIG. 1B in one embodiment). Furthermore, as shown in FIG. 1A, a single differential driver may be multiplexed with two single ended (e.g., DDR) drivers depending on chip's operating mode, e.g., by utilizing a multiplexer 108.

Figure 2:
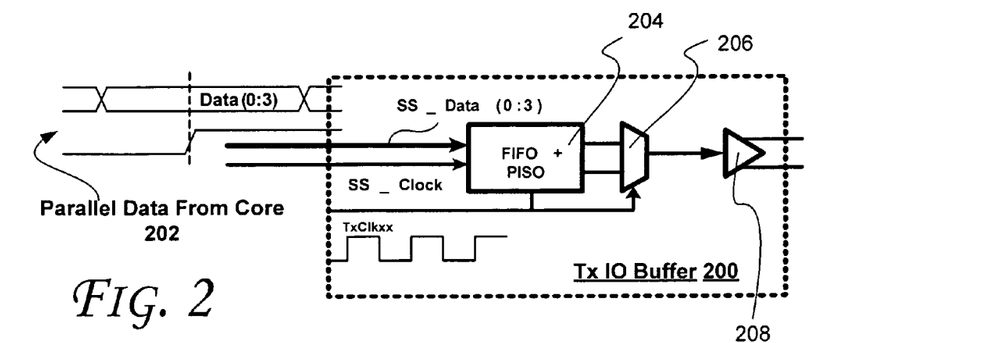
FIG. 2 illustrates an example of a transmit (Tx) Input/output (IO) buffer, in accordance with an embodiment.

FIG. 2 illustrates an example of a transmit (Tx) Input/output (IO) buffer 200, in accordance with an embodiment. The buffer 200 may receive parallel (e.g., low speed) data 202 from a processor core and transfer the received data to a high speed IO clock (Clk) domain (e.g., using a FIFO (First In, First Out) buffer illustrated in box 204) with a PISO (Parallel Input, Serial Output) (shown in box 204) converting the transferred data to serial bit streams. The output of FIFO-PISO logic 204 may pass through a multiplexer 206 (e.g., to serialize the output signals from the logic 204 in accordance with a transmit clock labeled as TxClkxx) and a driver 208 before being driven out to external world. In an embodiment, the PISO may include the multiplexor 206.

Moreover, FIG. 2 illustrates a transmit data path at a high level, in accordance with one embodiment. For example, low speed parallel data driven from core 202 (e.g., from low speed core clock rate, such as 1/9UI rate or frame rate) to IO along with source sync (SS) clock (referred to herein sometimes as "clk" or "Clk") (or could be without any SS clock, depending on the implementation, could be just on die wave-pipelined, etc.). Data may be first transferred to IO clock domain using a FIFO (e.g., stretching incoming data to absorb uncertainty between clock domains, and routing/physical difference within that data byte or signals group), and then parallel to serial conversion is done using the PISO, e.g., running at high speed IO clock (here IO clock is shown is half rate, 2-UI period) (generally odd-even data pipe). Transmit serial data is then driven out to pad/channel using the driver 208. For simplicity SS (Source Sync) clock and FIFO may be omitted from subsequent figures.

Figure 3:
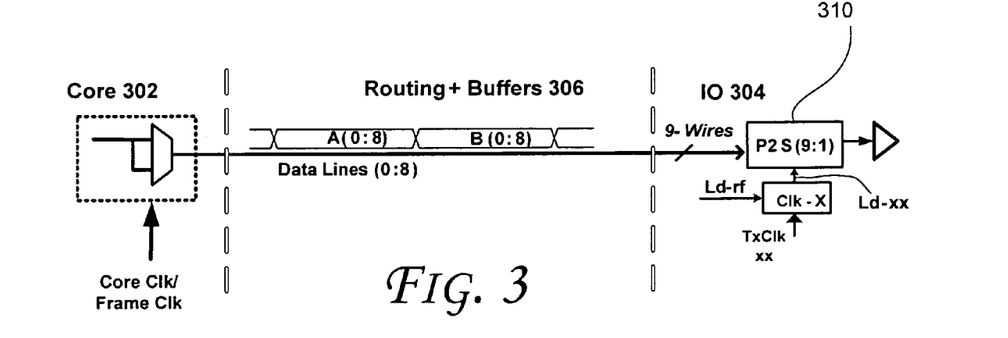
FIGS. 3-5 illustrate various information relating to differential mode implementation of even and odd frame combination data path architectures, according to some embodiments.
Figure 4:
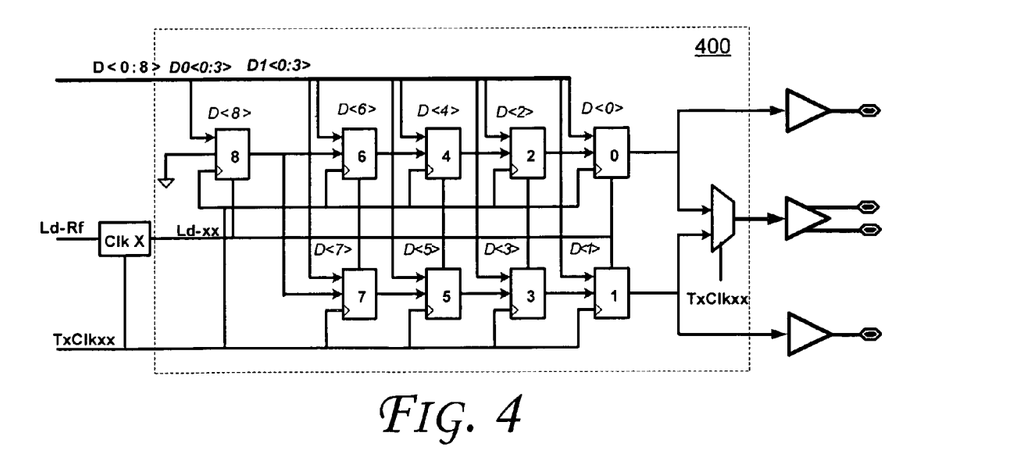
Figure 5:
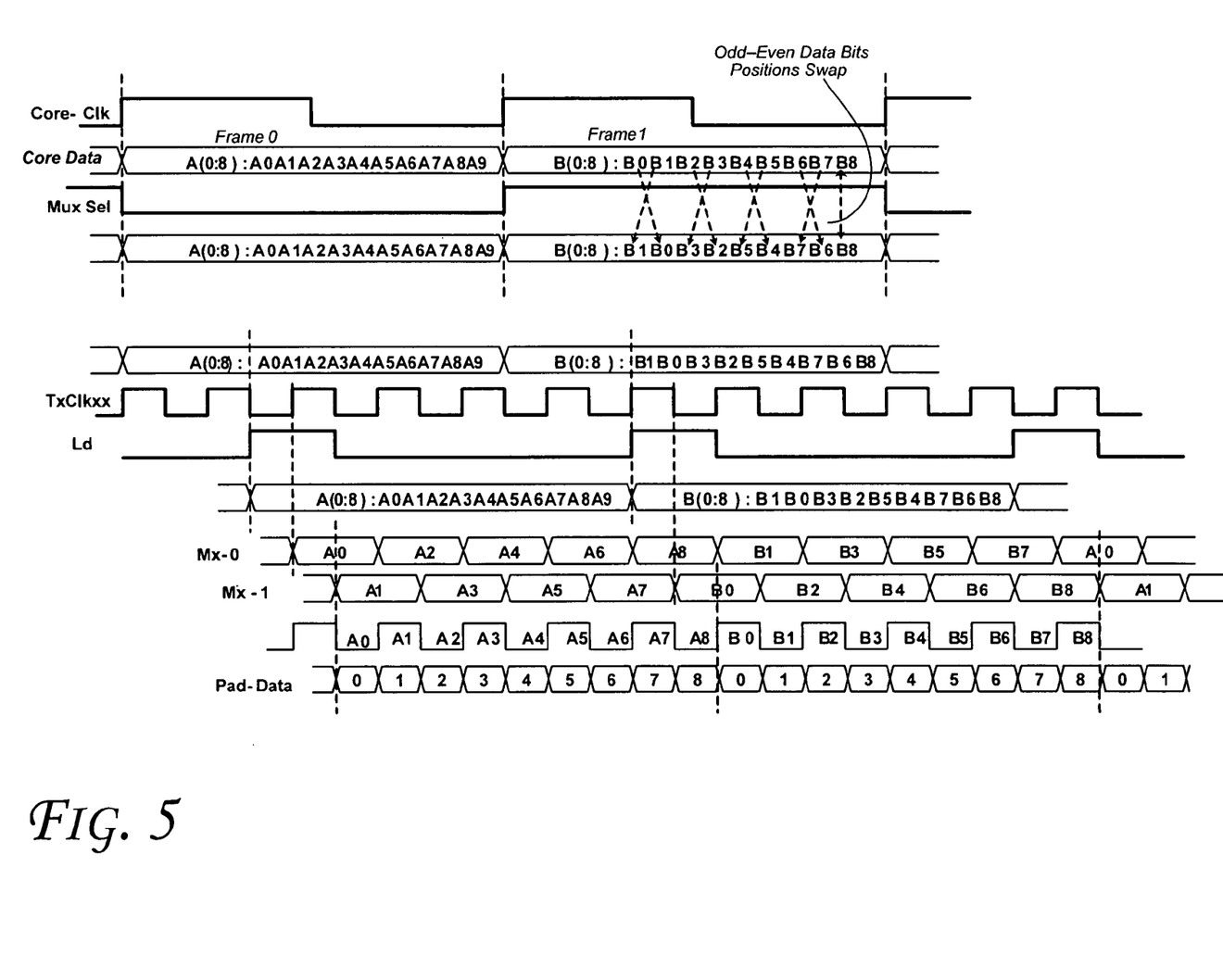

FIGS. 3-5 illustrate various information relating to differential mode implementation of even and odd frame combination data path architectures, according to some embodiments. Referring to FIG. 3, parallel data is sent form a core 302 to IO 304 using 9-wires (e.g., at frame rate ⅛th) through routing wires and/or buffers 306.

Referring to FIG. 4, a block diagram of a PISO 400 is shown, according to one embodiment. The PISO 400 (which may be used for logic 204 of FIG. 2 and/or P2S (Parallel to Serial) or PISO logic 310 of FIG. 3) may convert parallel data into serial data streams (e.g., even-odd steams and then multiplexed out). As shown, PISO 400 may include an even bank (e.g., labeled with 6, 4, 2, and 0 in FIG. 4) and an odd bank (e.g., labeled with 7, 5, 3, and 1 in FIG. 4) of storage devices (such as edge-triggered latches) in some embodiments.

FIG. 5 illustrates a timing diagram, according to an embodiment of the invention. A multiplexor (also referred to herein as "Mux") select (Mux Sel) in core may swap position of odd-even bits (here shown for data bit B(0:8)) for odd frames (in core), and a "load" signal ("Ld") in IO loads data into PISO, and then serially transmits data to pad. According, the PISO may serialize the data. In an embodiment, the PISO converts 9-parallel data bits into two even-odd bit streams, which are than multiplexed and driven out to the pad.

In some embodiments, in differential mode (e.g., 9UI frame), the core may send out parallel low speed data to IO using 9 wires running at frame rate (e.g., ⅛th rate of pad data). Low speed parallel core data may be first loaded into PISO in IO running at high-speed local IO transmit clock (with a local "load" signal, where load generally defines a safe window for incoming data, for example, a signal running at frame rate ⅛th; also, the load position is programmable in some embodiments). Since data frame is 9-UI in differential mode (not even, for example, 8UI or 4UI) and PISO converts the data to even-odd bit streams using half rate clock, position of even and odd bits on subsequent frames may be swapped (in alternate frames), such as shown in FIG. 5. The swapping may be done using a multiplexer in the core as shown in FIG. 3 (e.g., for frame A(0:8) odd-even position maintained, and for frame B(0:8) position of odd-bits swapped with even bits). The Mux Sel signal may be operated at half of frame rate (which may be half of core clock rate) as shown in the timing waveform (FIG. 5).

Figure 6:
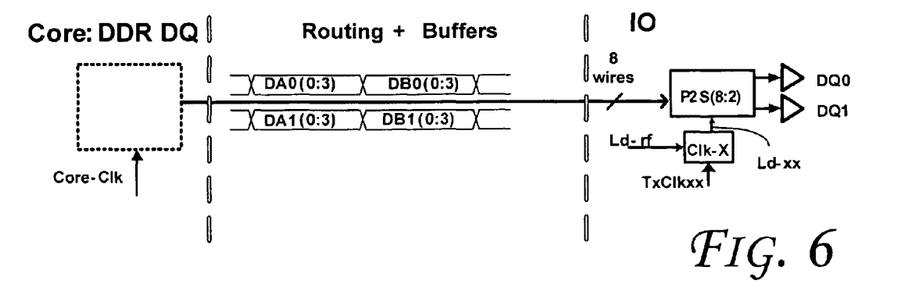
FIGS. 6-8 illustrate various information relating to single ended mode implementation of even and odd frame combination data path architectures, according to some embodiments.
Figure 7:
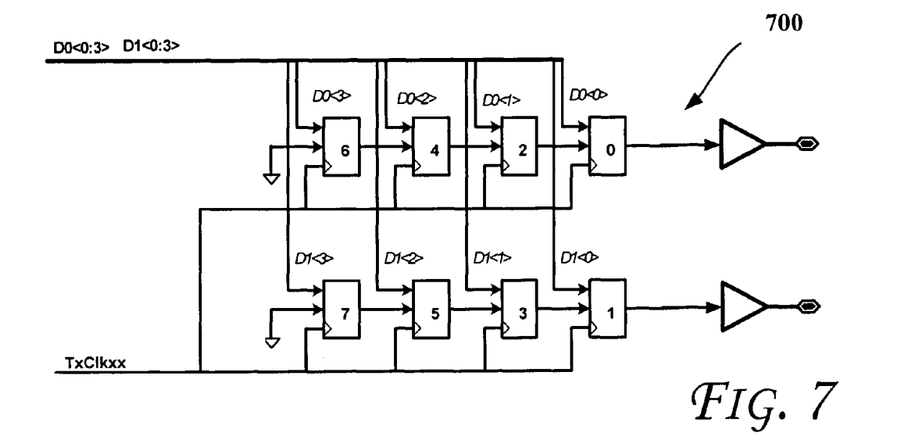
Figure 8:
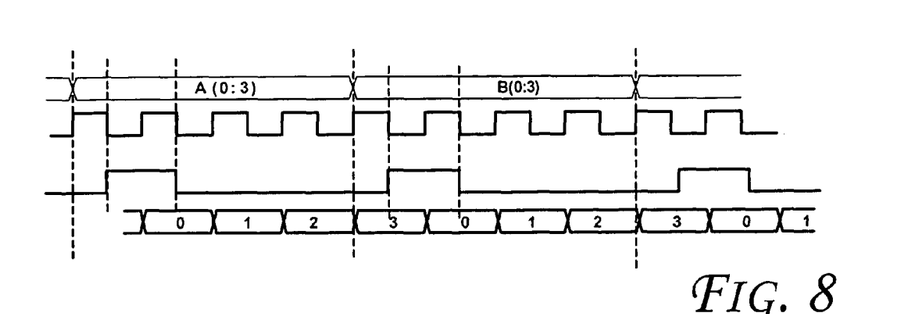

FIGS. 6-8 illustrate various information relating to single ended mode implementation of even and odd frame combination data path architectures, according to some embodiments. Referring to FIG. 6, a core Sends out data to IO via routing wires and/or buffers that are forwarded to a memory (e.g., a DDR memory) via two (e.g., DDR) drivers.

Referring to FIG. 7, a block diagram of a PISO 700 is shown, according to one embodiment. The PISO 700 (which may be used for the P2S 610 in an embodiment) may be operated based on full-rate IO clock and serialize data for pad. As shown, PISO 700 may include an even bank (e.g., labeled with 6, 4, 2, and 0 in FIG. 7) and an odd bank (e.g., labeled with 7, 5, 3, and 1 in FIG. 7) of storage devices (such as edge-triggered latches) in some embodiments.

Referring to FIG. 8, a timing waveform for one of the two drivers (e.g., shown in FIGS. 6 and 7) is shown, according to an embodiment. In one embodiment, the two drivers may be identical. In single ended (e.g., DDR) mode, 8-UI data burst DQ, 4-UI command/address (CA) lines (e.g., using the combination buffer). In some embodiments, a combination driver may support two DDR drivers. Each DDR driver may be sending data DQ (e.g., 8-UI data burst), or send out Command/Address (e.g., 4UI or lower speed) to a memory (e.g., including memory 1212 of FIG. 12). DDR UI size (e.g., in ps) may be in general 2× bigger than the differential UI (e.g., 3.2 GTs differential vs. 1600 MTs DDR in some embodiments). In one embodiment, DDR or single ended mode may utilized 8-UI PISO, operating based on the full-rate clock. The core may send out 4+4 (or eight) parallel low speed data to IO for two DDR drivers as discussed with reference to FIGS. 6-8. As an example, for a pad data rate for 1600 MTs (UI=625 ps), IO clock may be about 1600 Ghz (e.g., full rate), where the core clock is at about 800 Mhz. Core to IO data rate may be 400 MTs (¼th of pad rate), and four-to-one parallel to serial conversion may occur in IO PISO, as shown in FIGS. 6-9. In one embodiment, the ninth wire and ninth bit used in the differential mode may be ignored in DDR or single ended mode).

Figure 9:
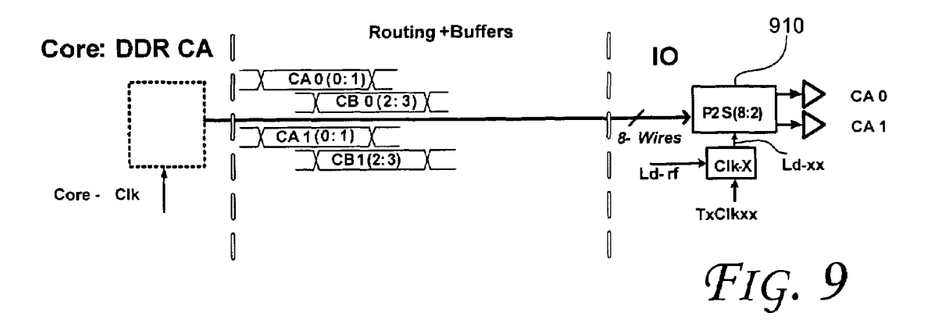
FIGS. 9-11 illustrate various information relating to Command/Address (CA) for single ended mode implementation of even and odd frame combination data path architectures, according to some embodiments.
Figure 10:
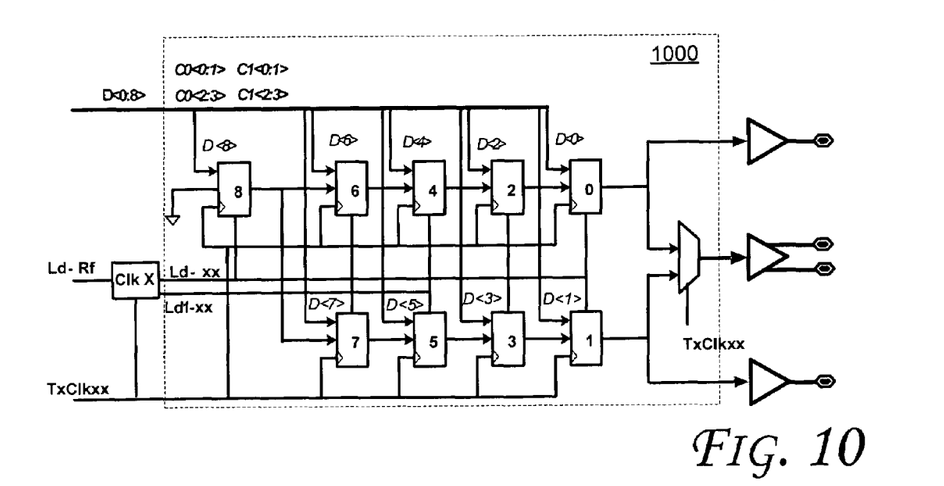
Figure 11:
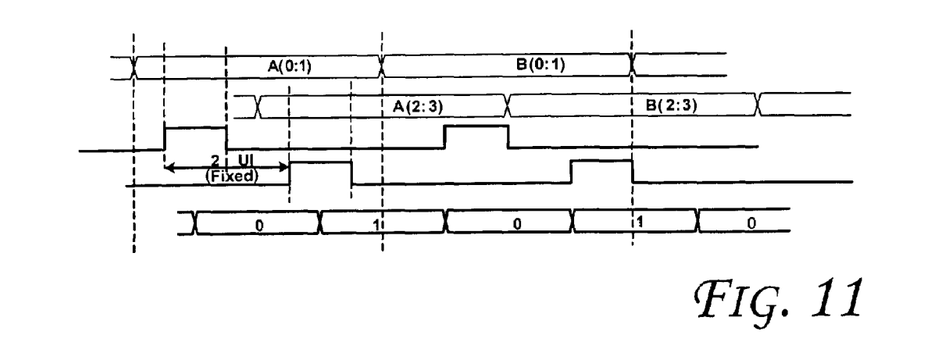

FIGS. 9-11 illustrate various information relating to Command/Address (CA) for single ended mode (e.g., for a DDR mode) implementation of even and odd frame combination data path architectures, according to some embodiments. Referring to FIG. 9, a core sends out a CA, e.g., in every core cycle (e.g., 400 MTs), to IO (e.g., stretched to two core cycles and staggered by one core cycle).

Referring to FIG. 10, a block diagram of a PISO 1000 is shown, according to one embodiment of the invention. The PISO 1000 (e.g., such as the P2S 910 in the IO partition) may captures the data using two staggered load signals (as shown FIG. 9-11), and serially drive the data to pad. For example for a 1600 MTs DDR DQ, 800 MTs CA needs to be sent out. ore running at 800 Mhz may generate one CA in every core clock cycle, which may be sent to IO (e.g., with each CA from core being stretched to two cycles, for example, to result in 400 MTs). Further, each CA may be staggered by one core cycle, which is loaded and multiplexed in IO to send out 800 MTs CA at pad. In some embodiments, for differential mode and single ended (e.g., DDR DQ) mode, loads may be the same (1d−xx=1dxx1), where in DDR CA mode 1dxx1=1dxx+2UI (shifted). As shown, PISO 1000 may include an even bank (e.g., labeled with 8, 6, 4, 2, and 0 in FIG. 10) and an odd bank (e.g., labeled with 7, 5, 3, and 1 in FIG. 10) of storage devices (such as edge-triggered latches) in some embodiments.

Additionally, even though in the present disclosure, the transmit path is used to illustrate the embodiments, the techniques discussed may also be applied to combination receive (Rx) path, in which case the PISO logics discussed may be replaced with SIPO (Serial In Parallel Outs) logics. Additionally, the bit swapping may be performed by a memory controller prior to transmission to a FIFO, to SIPO, and consequently to drivers that provide the data to a processor.

Furthermore, some of the embodiments discussed herein may allow for one or more of: (a) Resource sharing between 9UI, 8UI combination data paths (e.g., physical routing and resource leverage). (b) Direct conversion of parallels low speed data to high speed data at IO (e.g., 9 to 1 or 8 to 1 conversion in IO). No intermediate speed conversion or multiple levels of FIFO in between may be needed. (c) Reduced and/or optimized data path latency (e.g., less conversion, less levels of circuitry). (d) Lower power and clock loading (e.g., in part, since additional conversion and FIFO levels been removed). (e) Lower latency data path. (e) Improved power efficiency and simplicity over some current implementations.

Figure 12:
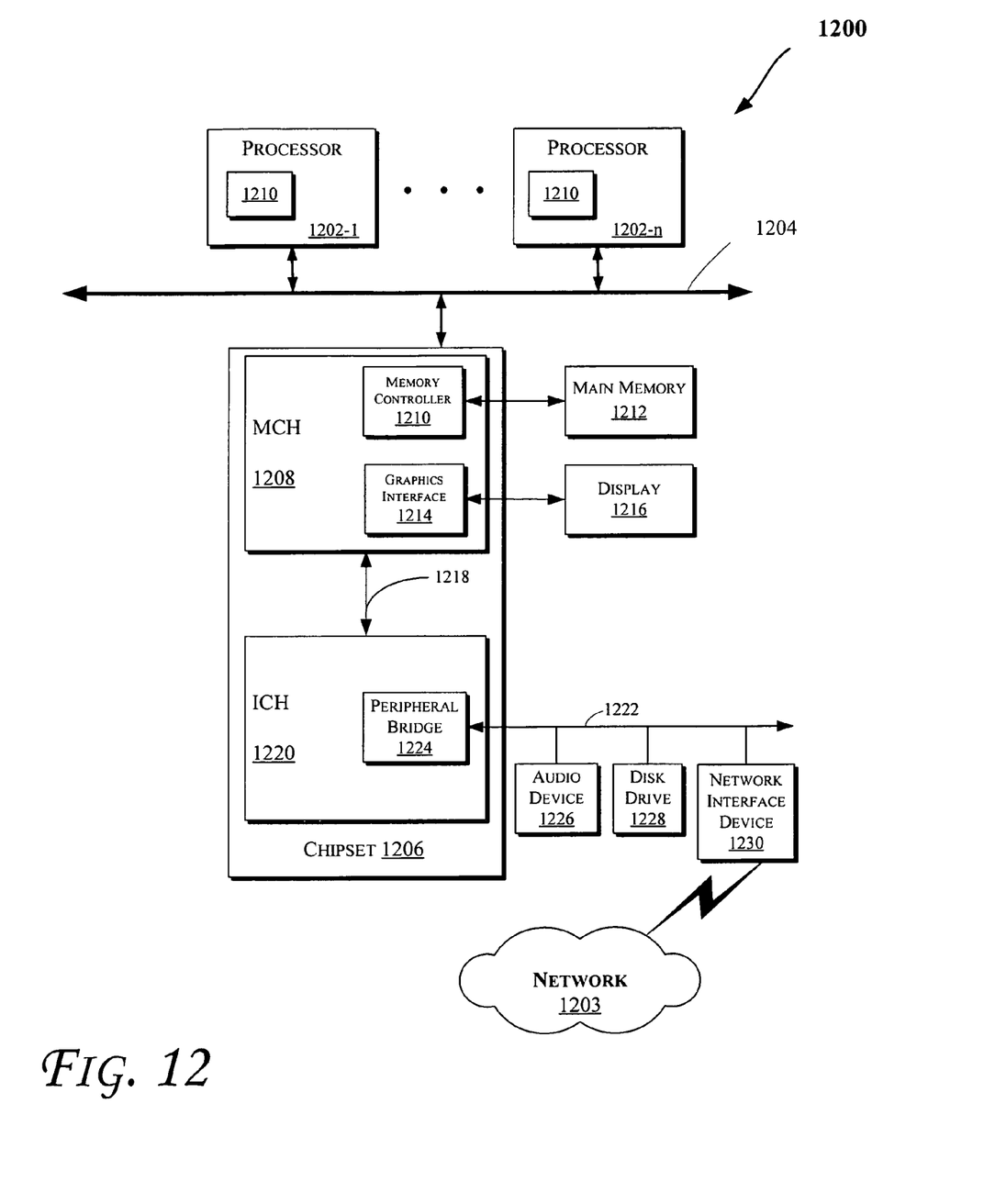
FIG. 12 illustrates a block diagram of a computing system in accordance with an embodiment of the invention.

FIG. 12 illustrates a block diagram of a computing system 1200 in accordance with an embodiment of the invention. The computing system 1200 may include one or more central processing unit(s) (CPUs) 1202 or processors that communicate via an interconnection network (or bus) 1204. The processors 1202 may include a general purpose processor, a network processor (that processes data communicated over a computer network 1203), or other types of a processor (including a reduced instruction set computer (RISC) processor or a complex instruction set computer (CISC)). Moreover, the processors 1202 may have a single or multiple core design. The processors 1202 with a multiple core design may integrate different types of processor cores on the same IC die. Also, the processors 1202 with a multiple core design may be implemented as symmetrical or asymmetrical multiprocessors. In an embodiment, techniques discussed with reference to FIGS. 1-11 may be used to transmit data between various components of system 1200 (e.g., between the processor(s) 1202 and memory 1212, between core(s) of processor(s) 1202 and memory controller 1212, etc.).

A chipset 1206 may also communicate with the interconnection network 1204. The chipset 1206 may include a memory control hub (MCH) 1208. The MCH 1208 may include a memory controller 1210 that communicates with a memory 1212. The memory 1212 may store data, including sequences of instructions, that are executed by the CPU 1202, or any other device included in the computing system 1200. For example, operations may be coded into instructions (e.g., stored in the memory 1212) and executed by processor(s) 1202. In one embodiment of the invention, the memory 1212 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 1204, such as multiple CPUs and/or multiple system memories.

The MCH 1208 may also include a graphics interface 1214 that communicates with a display device 1216. In one embodiment of the invention, the graphics interface 1214 may communicate with the display device 1216 via an accelerated graphics port (AGP). In an embodiment of the invention, the display 1216 (such as a flat panel display) may communicate with the graphics interface 1214 through, for example, a signal converter that translates a digital representation of an image stored in a storage device such as video memory or system memory into display signals that are interpreted and displayed by the display 1216. The display signals produced by the display device may pass through various control devices before being interpreted by and subsequently displayed on the display 1216.

A hub interface 1218 may allow the MCH 1208 and an input/output control hub (ICH) 1220 to communicate. The ICH 1220 may provide an interface to I/O device(s) that communicate with the computing system 1200. The ICH 1220 may communicate with a bus 1222 through a peripheral bridge (or controller) 1224, such as a peripheral component interconnect (PCI) bridge, a universal serial bus (USB) controller, or other types of peripheral bridges or controllers. The bridge 1224 may provide a data path between the CPU 1202 and peripheral devices. Other types of topologies may be utilized. Also, multiple buses may communicate with the ICH 1220, e.g., through multiple bridges or controllers. Moreover, other peripherals in communication with the ICH 1220 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 1222 may communicate with an audio device 1226, one or more disk drive(s) 1228, and a network interface device 1230 (which is in communication with the computer network 1203). Other devices may communicate via the bus 1222. Also, various components (such as the network interface device 1230) may communicate with the MCH 1208 via a high speed (e.g., general purpose) I/O bus channel in some embodiments of the invention. In addition, the processor 1202 and other components shown in FIG. 12 (including but not limited to the MCH 1208, one or more components of the MCH 1208, etc.) may be combined to form a single chip. Furthermore, a graphics accelerator may be included within the MCH 1208 in other embodiments of the invention.

Furthermore, the computing system 1200 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 1228), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

In an embodiment, components of the system 1200 may be arranged in a point-to-point (PtP) configuration. For example, processors, memory, and/or input/output devices may be interconnected by a number of point-to-point interfaces.

Reference in the specification to "one embodiment," "an embodiment," or "some embodiments" means that a particular feature, structure, or characteristic described in connection with the embodiment(s) may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:
1. An apparatus comprising:
 a single first in, first out (FIFO) buffer to receive parallel data from a source;
 a parallel input, serial output (PISO) logic coupled to the FIFO buffer to generate one or more serial bit streams based on the parallel data; and
 a driver coupled to the PISO logic to transmit the one or more serial bit streams to a destination,
 wherein the parallel data is to be directly converted to the one or more serial bit streams without intermediate speed conversion and wherein the PISO is to swap a position of even and odd bits in alternate frames.

2. The apparatus of claim 1, wherein the PISO logic comprises a plurality of storage devices to store each bit of the received parallel data.

3. The apparatus of claim 2, wherein the plurality of storage devices form a first bank to store odd bits of the received parallel data and a second bank to store even bits of the received parallel data.

4. The apparatus of claim 3, wherein the PISO logic further comprises a multiplexor to receive serialized outputs of the first and second banks and to generate an output based on a transmit clock signal.

5. The apparatus of claim 1, further comprising a plurality of drivers coupled to the PISO logic to transmit the one or more serial bit streams to the destination.

6. The apparatus of claim 1, wherein the source comprises a processor.

7. The apparatus of claim 6, wherein the processor comprises one or more processor cores, wherein the FIFO buffer is coupled to at least one of the one or more processor cores.

8. The apparatus of claim 1, wherein the source comprises a multiplexor to swap at least some bits of the parallel data prior to transmission to the FIFO buffer.

9. The apparatus of claim 1, wherein the destination comprises a memory.

10. The apparatus of claim 9, wherein the memory comprises a double data rate (DDR) memory.

11. The apparatus of claim 1, wherein the parallel data is to be converted to the one or more serial bit streams without utilization of multiple levels of the FIFO.

12. A method comprising:
receive parallel data from a source;
storing the received data in a single first in, first out (FIFO) buffer;
generating one or more serial bit streams based on the parallel data;
transmitting the one or more serial bit streams to a destination; and
multiplexing serialized outputs of the first and second memory banks based on a transmit clock signal,
wherein the parallel data is to be directly converted to the one or more serial bit streams without intermediate speed conversion and wherein the PISO is to swap a position of even and odd bits in alternate frames.

13. The method of claim 12, further comprising storing odd bits of the received parallel data in a first memory bank and storing even bits of the received parallel data in a second bank of memory.

14. The method of claim 12, further comprising swapping at least some bits of the parallel data prior to transmission of the parallel data from the source.

15. A system comprising:
a memory to store data;
a processor to process the stored data; and
an interface to couple the memory and processor, the interface to comprise:
a buffer to receive parallel data from the processor;
a parallel input, serial output (PISO) logic coupled to the buffer to generate one or more serial bit streams based on the parallel data; and
a driver coupled to the PISO logic to transmit the one or more serial bit streams to the memory,
wherein the parallel data is to be directly converted to the one or more serial bit streams without intermediate speed conversion and wherein the PISO is to swap a position of even and odd bits in alternate frames.

16. The system of claim 15, wherein the PISO logic comprises a plurality of storage devices to store each bit of the received parallel data.

17. The system of claim 15, further comprising a plurality of drivers coupled to the PISO logic to transmit the one or more serial bit streams to the memory.

18. The system of claim 15, further comprising an audio device coupled to the memory.

19. The apparatus of claim 1, wherein the parallel data is to be transmitted to the destination in accordance with only single ended signals or differential signals.

20. The apparatus of claim 19, wherein the single ended signals correspond to 8 unit interval (UI) data.

21. The method of claim 12, further comprising transmitting the parallel data to the destination in accordance with only single ended signals or differential signals.

22. The system of claim 15, wherein the parallel data is to be transmitted to the destination in accordance with only single ended signals or differential signals.

23. The apparatus of claim 19, wherein the differential signals correspond to 9 UI data.

24. The system of claim 15, wherein the processor is to swap at least some bits of the parallel data prior to transmission to the buffer.

* * * * *